United States Patent

White

[15] 3,705,741
[45] Dec. 12, 1972

[54] ENERGY ABSORBING BUMPER MOUNT AND RESTORATION TOOL THEREFOR

[72] Inventor: Robert L. White, Frankenmuth, Mich.

[73] Assignee: General Motors Corporation, Detroit, Mich.

[22] Filed: July 30, 1971

[21] Appl. No.: 167,616

[52] U.S. Cl. ................................293/89, 188/1 C
[51] Int. Cl. ................................................B60r 19/00
[58] Field of Search...188/1 C; 213/1 A; 293/DIG. 3, 293/70, 73, 85, 86, 89

[56] References Cited

UNITED STATES PATENTS

| | | | |
|---|---|---|---|
| 3,392,599 | 7/1968 | White | 188/1 C X |
| 3,432,200 | 3/1969 | Barton | 293/71 R |

Primary Examiner—James B. Marbert
Assistant Examiner—Robert Saifer
Attorney—W. E. Finken et al.

[57] ABSTRACT

An energy absorber of the type having a plurality of rolling bodies engaged between a pair of telescopable cylinders mounts a bumper to a vehicle. One of the telescopable cylinders is attached to the vehicle frame and the other is releasably clamped to the bumper and includes a splined surface on the inner periphery thereof. A restoring tool includes a hook which is used in conjunction with a conventional bumper jack in pulling the bumper away from the frame, thus restoring the cylinders to their pre-impact axial relation. The restoring tool also includes a splined portion which, subsequent to release of the clamp attaching the cylinder to the bumper, is inserted into the cylinder and used in conjunction with the bumper jack to effect rotation of the cylinder and consequent alignment of the rolling bodies with an undeformed area of the cylinder.

5 Claims, 4 Drawing Figures

PATENTED DEC 12 1972

INVENTOR.
Robert L. White
BY
D. L. Ellis
ATTORNEY

INVENTOR.
Robert L. White
BY
D. L. Ellis
ATTORNEY

ENERGY ABSORBING BUMPER MOUNT AND RESTORATION TOOL THEREFOR

BACKGROUND OF THE INVENTION

The invention relates to energy absorbers and more particularly to an energy absorbing bumper mount and a tool for restoring the bumper mount subsequent to impacting.

My U.S. Pat. 3,392,559 discloses an energy absorbing device including first and second telescopably related energy absorption cylinders having engaged with predetermined interference therebetween one or more annular rows of spheroids or similar rolling bodies which roll when the cylinders are forced to telescope relative one another causing highly localized plastic deformation in at least one of the cylinders to absorb the impact energy. In this patent, I noted that such an energy absorber may be used repeatedly by rotating the telescopable cylinders slightly relative one another following the energy absorption excursion therebetween to reorient the rolling bodies into undeformed areas of the cylinder walls.

In my present invention, I provide an improved mounting arrangement for an energy absorber of the aforementioned type for use as a vehicle bumper mount.

Furthermore, I provide a tool for the restoration of an impacted energy absorber of the aforementioned type so that it may repeat its energy absorbing function upon a subsequent impact.

SUMMARY OF THE INVENTION

According to my invention, the first cylinder of the energy absorber is firmly attached to a vehicle frame member while the second cylinder is releasably clamped to the vehicle bumper. An access hole is provided in the face of the bumper through which the tubular post of a conventional bumper jack may be inserted into the telescoped cylinders of the impacted energy absorber with the base of the jack post engaging the bottom of the cylinder attached to the vehicle frame. A tool in the form of a metal strap is hooked to the bumper and to the ratchet mechanism of the bumper jack. Operation of the bumper jack pulls the bumper axially away from the vehicle frame and in so doing restores the cylinders to their pre-impact axially extended relationship. The releasable clamping arrangement which connects the second cylinder to the bumper structure is released to permit rotation of the cylinder relative the rotationally stationary bumper structure and first cylinder. A spline is formed on the internal periphery of the second cylinder. A tool consisting of a cylindrical body having a spline formed on the end thereof is inserted into the second cylinder and the bumper jack is utilized to effect rotation of the tool and the second cylinder splinedly connected thereto by jacking against a lever which is attached to and extends laterally from the axis of the cylindrical tool body. The second cylinder is then again clamped to the bumper structure.

An indexing arrangement is provided which prevents rotation of the second cylinder in excess of that degree which is necessary for aligning the rolling bodies with an undeformed area of the cylinders. A number of knockout pins are displayed angularly about the axis of the energy absorber and an abutment surface is provided on the second cylinder for engagement with one of the knockout pins. Prior to rotating the second cylinder the operator must knock out the knockout pin which engages the second cylinder. The second cylinder may then be rotated until the abutment engages the next knockout pin. The angular spacing between the knockout pins is just sufficient to assure alignment of the rolling bodies with an undeformed area of the cylinders so that the undeformed cylinder area is conserved to the end that the energy absorber may be restored for operation a maximum number of times.

BRIEF DESCRIPTION OF THE DRAWINGS

The many objects and advantages of the present invention will become apparent upon consideration of the following description and the accompanying drawings in which.

DESCRIPTION OF THE PREFERRED EMBODIMENT

The Bumper Mount

Figure 1:
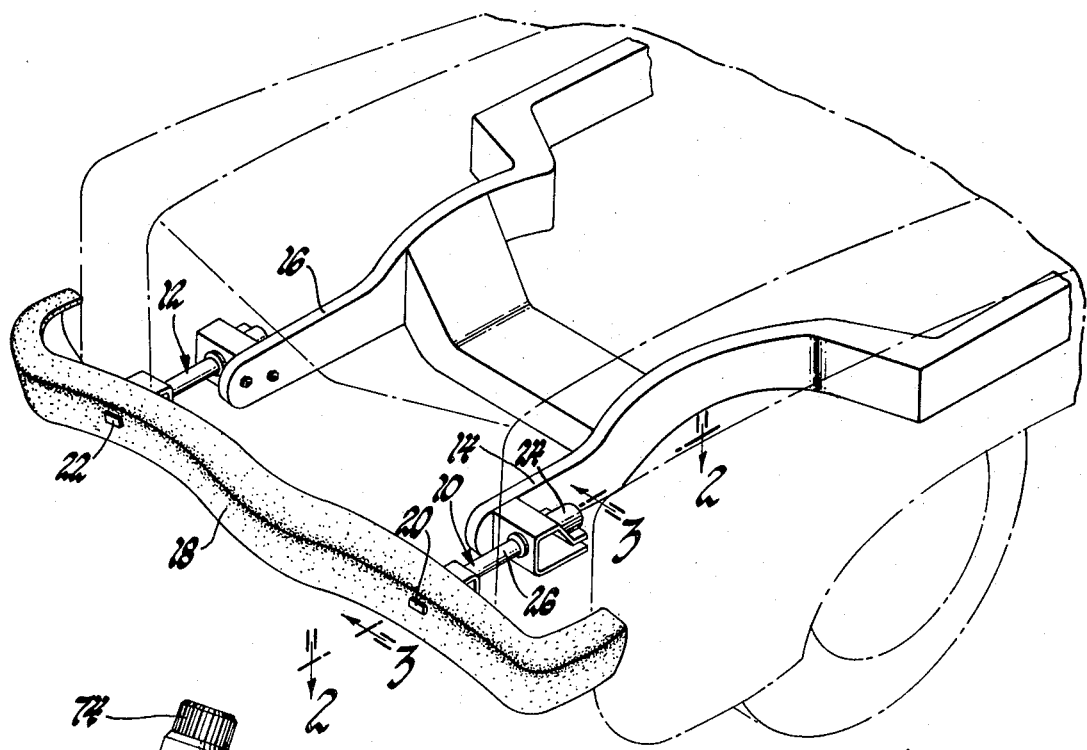
FIG. 1 is a perspective view having parts broken away to show the general arrangement of the energy absorbing bumper mount.

Referring to FIG. 1, a pair of energy absorbers 10 and 12 respectively connect laterally spaced frame members 14 and 16 to laterally spaced points on a vehicle bumper 18. The bumper 18 is preferably a rigid frame 34 covered with a resilient material 36. Removable cover plates 20 and 22 may be removed for access to the point of attachment between the bumper frame 34 and the respective energy absorbers.

Figure 2:
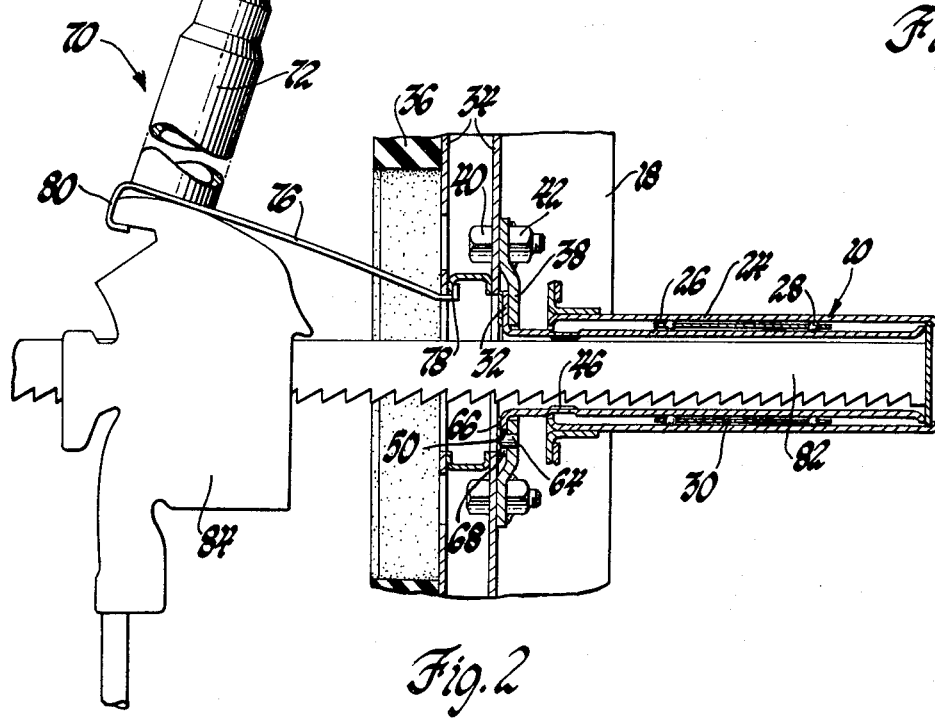
FIG. 2 is a sectional view taken in the direction of arrows 2—2 of FIG. 1, showing the energy absorber collapsed and the restoring tool poised for axial restoration of the energy absorber.
Figure 3:
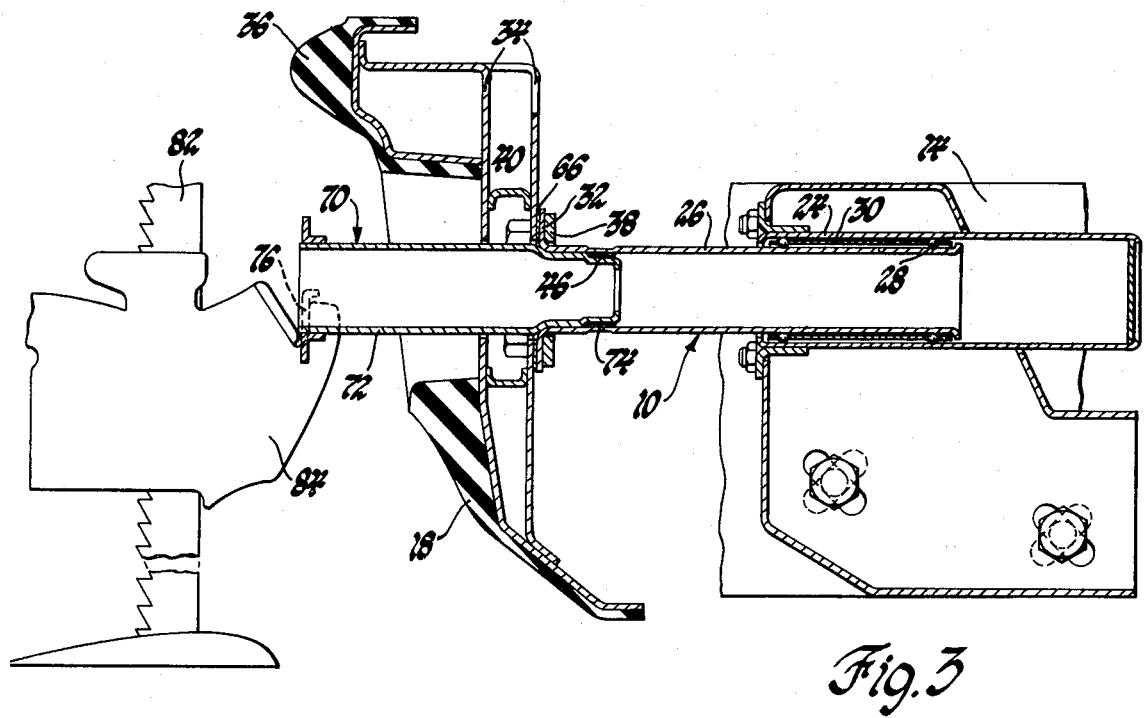
FIG. 3 is a sectional view taken in the direction of arrows 3—3 of FIG. 1, showing the restoring tool poised for rotary restoring movement of the energy absorber.

Referring now to FIGS. 2 and 3, it can be seen that the energy absorber 10 includes an outer cylinder 24, an inner cylinder 26, and a number of hardened rolling bodies or balls 28 engaged therebetween with predetermined interference fit and carried in two axially spaced rows by a sleeve 30. In FIG. 2, the energy absorber 10 is shown subsequent to impacting, the inner cylinder 26 having been telescoped into the outer cylinder 24 and the rolling bodies 28 having caused energy absorbing plastic deformation of the outer cylinder 24 and the inner cylinder 26.

Restoration of the impacted energy absorber 10 necessitates rotation of inner cylinder 26 relative the outer cylinder 24 so as to align the rolling bodies 28 with undeformed areas on the peripheries of the respective cylinders. In view of the fact that both the bumper 18 and the vehicle frame 14 are rotationally stationary, it is necessary to detach the inner cylinder 26 from the bumper 18 so it may be rotated relative the outer cylinder 24.

A flange 32 is formed on the end of inner cylinder 26 and is clamped against the rigid frame 34 of the bumper 18 by a bracket 38. The bracket 38 is bolted to the rigid frame 34 by a number of bolts 40 and nuts 42. It is apparent that loosening of the bolts 40 relieves the force which clamps flange 32 of inner tube 26 between the rigid frame 34 and the bracket 38. The nuts 42 are preferably welded to bracket 38 to facilitate loosening of bolts 40. A spline 46 is formed on a segment of the inner periphery of inner cylinder 26 for attachment of a restoring tool as will be hereinafter described.

Figure 4:
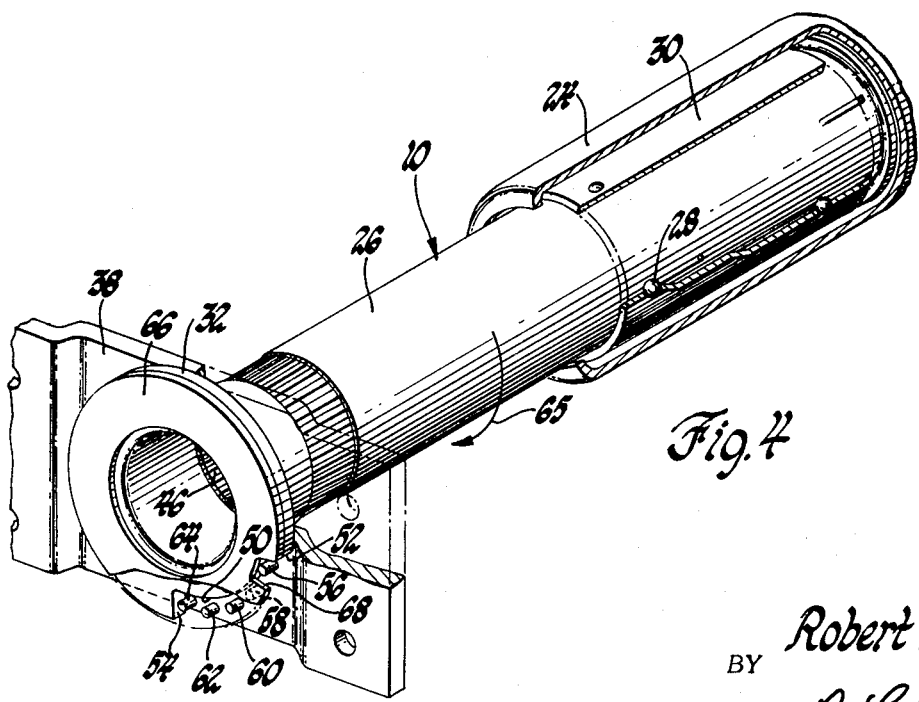
FIG. 4 is a perspective view showing the mounting of the energy absorber to the bumper.

An indexing arrangement is provided to limit rotation of inner cylinder 26 relative outer cylinder 24. As best shown in FIG. 4, an angular segment of the flange 32 is cut away to form a window 50 which terminates at walls 52 and 54. A plurality of knockout pins 56, 58, 60, 62 and 64 are press fitted in bracket 38 in an angular display about the axis of the inner cylinder 26. The knockout pins 56 extend axially into the window 50 with the first knockout pin 56 engaging the wall 52 of window 50. It is apparent that rotation of inner cylinder 26 relative the outer cylinder 24 in the direction of arrow 65 is prevented until the knockout pin 56 is pounded flush with bracket 38 so that it no longer engages wall 52 of window 50. The inner cylinder 26 may then be rotated but only until the wall 52 engages the second knockout pin 58.

In order to insure that the operator taps out the proper knockout pin, an annular plate 66 is suitably keyed or welded to the face of the flange 32 for rotation therewith and includes a window 68 which exposes only that pin which engages the wall 52 of window 50. In this manner, only that pin which is to be knocked out is visible to the operator at any time.

THE RESTORING TOOL AND OPERATION

Referring again to FIG. 2, a tool 70 for restoring the energy absorber 10 to its operative condition is shown. The tool 70 includes a cylindrical body 72 having a splined portion 74 formed on the end thereof. A bar or strap 76 is suitably affixed as by welding to the other end of the cylindrical body 72 and is bent at the ends to form hooks 78 and 80. A conventional bumper jack is used in conjunction with the tool 70 to restore the bumper 18 to its normal pre-impact axially spaced relation with the vehicle frame. The jack post 82 is inserted through the bumper 18 and down the throat of the inner cylinder 26 and outer cylinder 24 so that its end engages the bottom of the outer cylinder 24. The tool 70 is then positioned with hook 78 engaging the rigid frame 34 of bumper 18 and the hook 80 engaging the jack ratchet mechanism 84. It is apparent that operation of the bumper jack will pull the bumper structure 18 away from the frame member and in so doing restores the energy absorber cylinders 24 and 26 to their pre-impact axial relation. The bumper jack and tool 70 are then removed.

The knockout pin 56 which is displayed at window 68 is then pounded flush with the face of bracket 38 so that the inner cylinder 26 may be rotated. The operator loosens bolts 40 which are preferably the size of the wheel lug nuts so that the conventional tire wrench may be utilized. With the bolts 40 loosened, the inner cylinder 26 may be rotated relative the rigid frame 34 and the outer cylinder 24. Referring now to FIG. 3, the splined end 74 of the restoring tool 70 is then inserted into inner cylinder 26 so that the splines 46 of the inner cylinder 26 and the splines 74 of the restoring tool 70 are mated. The operator then uses the bumper jack in the conventional lifting manner against the strap 76 at a point adjacent hook 78 and in so doing rotates tool 70 and the inner cylinder 26 splinedly connected thereto. This rotation of the inner cylinder 26 is limited by the engagement of wall 52 of the inner cylinder window 50 with the knockout pin 58. Subsequent to rotation of the inner cylinder 24 and the consequent alignment of the rolling bodies 28 with undeformed areas on the cylinders 24 and 26, the tool 70 is removed and the bolts 40 tightened.

The restoring procedure is repeated with the energy absorber 12 and the cover plates 20 and 22 replaced.

It will be noted that while the preferred embodiment of the invention permits insertion of the jack post 82 inside the energy absorber, the bumper jack may be positioned against any suitable portion of the vehicle to pull the bumper 18 away from the vehicle frame. Furthermore, while the preferred embodiment contemplates releasably attaching one of the energy absorber cylinders to the bumper, the energy absorber cylinder could alternatively be releasably attached to the vehicle frame member.

Having thus described the invention, I claim:

1. An energy absorber in connection between a pair of relatively nonrotatable impact receiving bodies and comprising:
   a first member attached to one body;
   a second member telescopable with the first upon application of impact force thereto;
   a plurality of rolling bodies engaged between the members for plastically deforming at least one of the members when telescoped relative one another;
   releasable means attaching the second member to the other body;
   and means associated with the second member permitting application of a tool for effecting rotary movement of the second member relative the first and the other body when the releasable means is released.

2. The combination of claim 1 further characterized by:
   a pair of radially spaced abutment surfaces respectively nonrotatably associated with the second member and the second body, the abutment surfaces being engageable to limit rotation of the second member relative the second body to the radial space therebetween.

3. The combination of claim 1 further characterized by:
   an abutment surface formed on one of the second member or the second body;
   a plurality of knockout pins press-fitted in angularly spaced relation in the other of the second member or second body, the abutment surface being engageable with one of the knockout pins to prevent rotation of the second member relative the second body prior to knockout of the engaging knockout pin and then limit rotation of the second tubular member relative the second body to the angular space between successive knock-out pins.

4. In an automotive vehicle impact energy absorber of the type including a pair of telescopable members and a plurality of rolling bodies engaged therebetween for plastically deforming at least one of the members when application of impact force causes relative telescopic movement between the members, a tool for use in cooperation with a vehicle bumper jack to restore the energy absorber to its pre-impact condition comprising:

a strap bent to effect a connection between the jack and one of the members or means in connection therewith;

and means attachable to one of the members and including a lever extending radially from the axis of the member when attached thereto for engagement with the jack in effecting rotary movement of that member.

5. In an automotive vehicle impact energy absorber of the type including a pair of telescopable tubular members, the first member having axially extending abutment means formed on the inner periphery thereof, and a plurality of rolling bodies engaged between the tubular members for plastically deforming at least one of the tubular members when impact force causes relative telescopic movement between the tubular members, a tool for use in cooperation with a vehicle bumper jack to effect restoration of the energy absorber to its pre-impact condition, said tool comprising:

a strap bent to effect a connection between the jack and one of the tubular members or means in connection therewith;

a cylindrical portion insertable into the first tubular member, a lever portion extending radially from the axis of the cylindrical portion for engagement with the jack in effecting rotary movement of the cylindrical portion, and axially extending abutment means formed on the cylindrical portion and engageable with the abutment means of the first tubular member to connect the first tubular member with the cylindrical portion of the tool for rotation therewith.

* * * * *